(12) United States Patent
Happonen

(10) Patent No.: US 7,591,292 B2
(45) Date of Patent: Sep. 22, 2009

(54) DELIMBING APPARATUS

(76) Inventor: Antti Happonen, Rihmakuja 6, FIN-04230, Kerava (FI)

( * ) Notice: Subject to any disclaimer, the term of this patent is extended or adjusted under 35 U.S.C. 154(b) by 172 days.

(21) Appl. No.: 10/486,286

(22) PCT Filed: Aug. 12, 2002

(86) PCT No.: PCT/FI02/00663

§ 371 (c)(1), (2), (4) Date: Oct. 4, 2004

(87) PCT Pub. No.: WO03/013221

PCT Pub. Date: Feb. 20, 2003

(65) Prior Publication Data

US 2005/0061400 A1 Mar. 24, 2005

(30) Foreign Application Priority Data

Aug. 10, 2001 (FI) .................................. 20011630

(51) Int. Cl.
*A01G 23/095* (2006.01)
*B27L 1/00* (2006.01)

(52) U.S. Cl. ................................ 144/24.13; 144/208.2

(58) Field of Classification Search ................ 144/338, 144/208.1, 208.2, 24.12, 24.13; 47/1.01 R
See application file for complete search history.

(56) References Cited

U.S. PATENT DOCUMENTS

| | | | |
|---|---|---|---|
| 2,707,007 A * | 4/1955 | Shuff ........................ | 144/208.2 |
| 3,348,592 A * | 10/1967 | Winblad et al. ............... | 144/4.1 |
| 3,364,962 A | 1/1968 | Otterbach et al. | |
| 3,529,640 A | 9/1970 | Kamner | |
| 3,620,273 A * | 11/1971 | Propst et al. .................. | 144/4.1 |
| 3,941,174 A * | 3/1976 | Oldenburg ................ | 144/208.7 |
| 4,769,977 A * | 9/1988 | Milbourn ...................... | 56/15.2 |
| 4,781,228 A * | 11/1988 | Vaders ..................... | 144/24.13 |
| 5,322,102 A * | 6/1994 | Livingston ................ | 144/24.13 |
| 5,975,168 A * | 11/1999 | Ericksson .................... | 144/343 |
| 6,318,425 B1 * | 11/2001 | Niemi .......................... | 144/343 |
| 6,408,906 B1 * | 6/2002 | Moon et al. .............. | 144/24.13 |

FOREIGN PATENT DOCUMENTS

DE 3702760 A1 8/1988
EP 0407322 A1 1/1991

* cited by examiner

*Primary Examiner*—Shelley Self
(74) *Attorney, Agent, or Firm*—Birch, Stewart, Kolasch & Birch, LLP

(57) ABSTRACT

A delimbing apparatus for the delimbing of trees, which can be connected to a moving vehicle via a boom system. The apparatus includes a frame part and a delimbing head. The frame part is provided with gripping elements, by which the frame part is fastened against the trunk of the tree at a desired height during delimbing work. The apparatus includes a delimbing head which is separate from the frame part and is provided with a gripping device for gripping the trunk of the tree. The delimbing head is moved by drive means along the tree trunk, and at least one delimbing cutter and a feed and control cable for transmitting operating power, connected between the delimbing head moving along the trunk of the tree and the frame part.

15 Claims, 6 Drawing Sheets

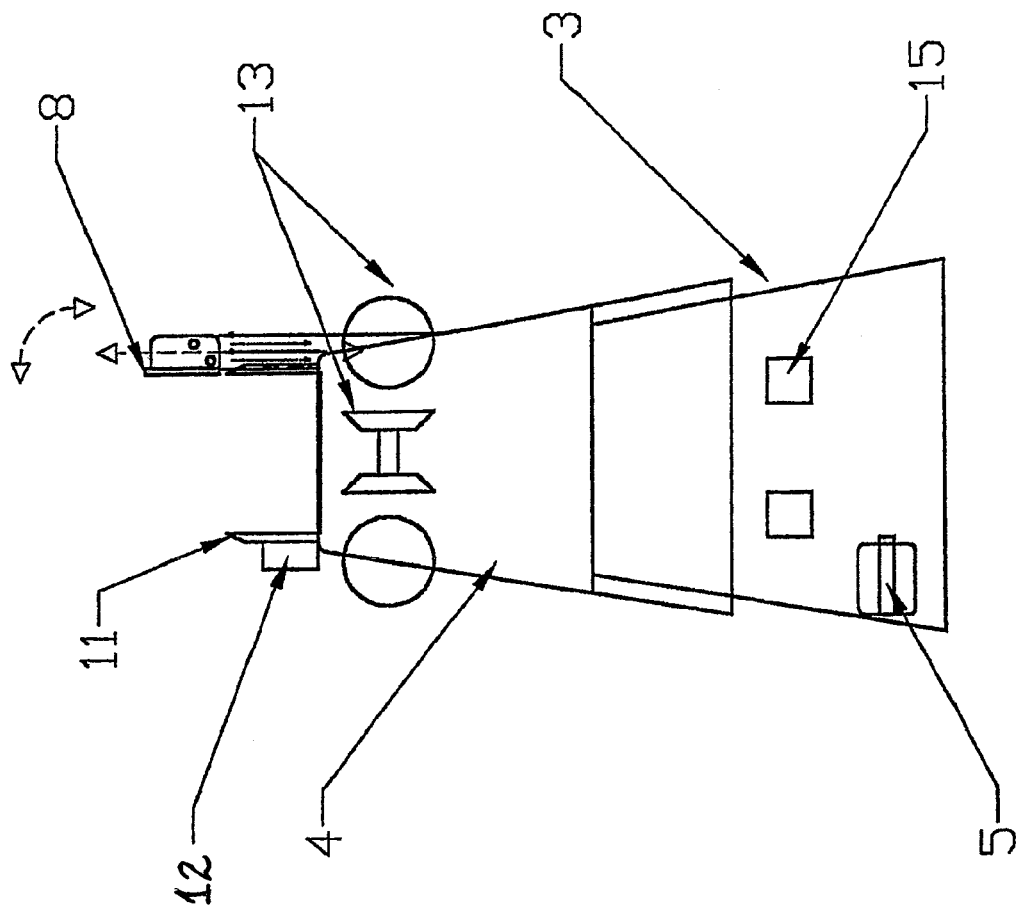

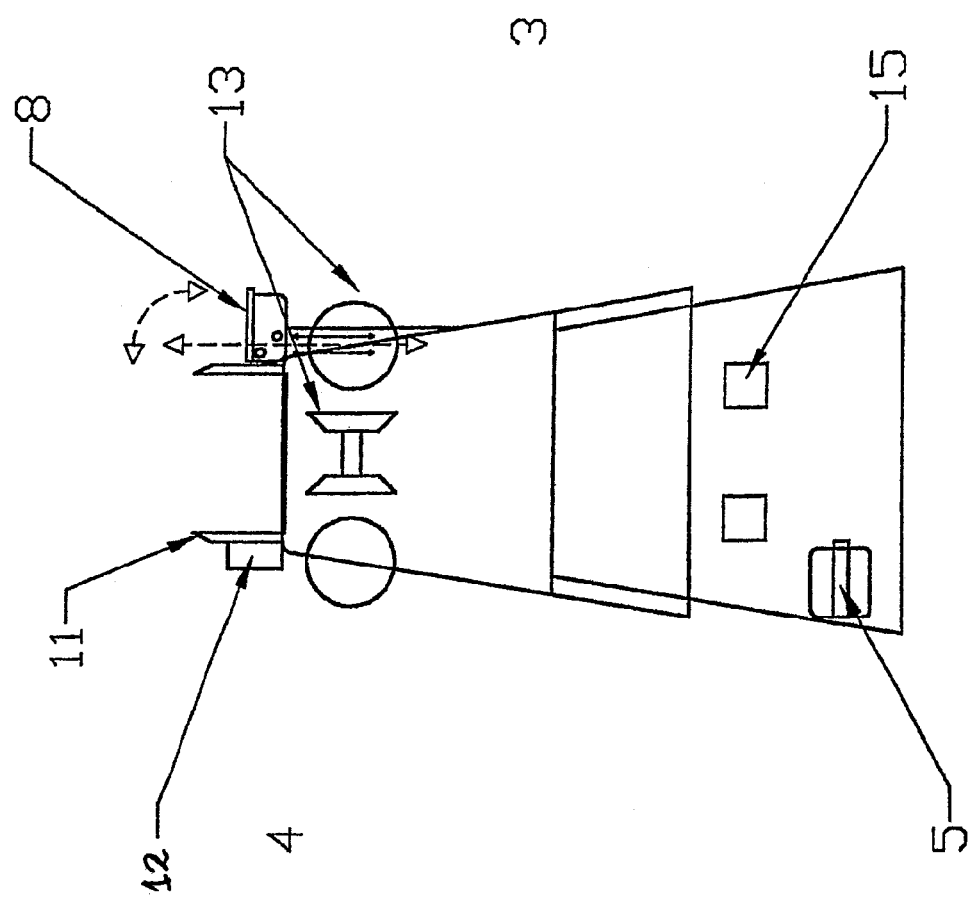

DELIMBING APPARATUS

CROSS-REFERENCE TO RELATED APPLICATION

The present application claims priority to Finnish Application No. FI 2001-1630 filed on Aug. 10, 2001 and International Application No. PCT/FI/02/00663 filed Aug. 12, 2002, the entire contents of which are hereby incorporated by reference.

BACKGROUND OF THE INVENTION

1. Field of the Invention

The present invention relates to a delimbing apparatus.

2. Description of Background Art

Today, harvester heads are known that can be connected to a forestry machine, by means of which trees are felled, delimbed and cut into pieces of desired length in one operation in the forest. This type of harvester heads is thus only applicable for the felling of trees and the subsequent handling of logs.

SUMMARY AND OBJECTS OF THE INVENTION

The object of the invention is to achieve a completely new type of delimbing apparatus that is applicable for pre-delimbing desired parts of living standing trees and, when necessary, also for thinning and felling.

It is also an object of the invention to achieve an apparatus for producing high-quality forest, by means of which trees can be delimbed while they are still alive, by removing dried-up and otherwise unviable branches from the trees during their growth period, thus producing wood that is excellently suited for use as raw material in wood industry.

The delimbing apparatus of the invention uses a separate delimbing device that, driven by a drive mechanism, is able to climb up the clear trunk of a tree and cut off twigs and branches encountered. Also, when necessary, delimbing apparatus can be used to fell the tree in given lengths from above, or to cut it as a trunk from the base.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following, the invention will be described in detail by the aid of an example with reference to the attached drawings, wherein FIG. 5 presents the frame part and the delimbing head with the rotating upper cutter in a position for cutting heavy branches, and FIG. 6 presents the frame part and the delimbing head with the rotating upper cutter in rest position.

DETAILED DESCRIPTION OF THE PREFERRED EMBODIMENTS

Figure 1:
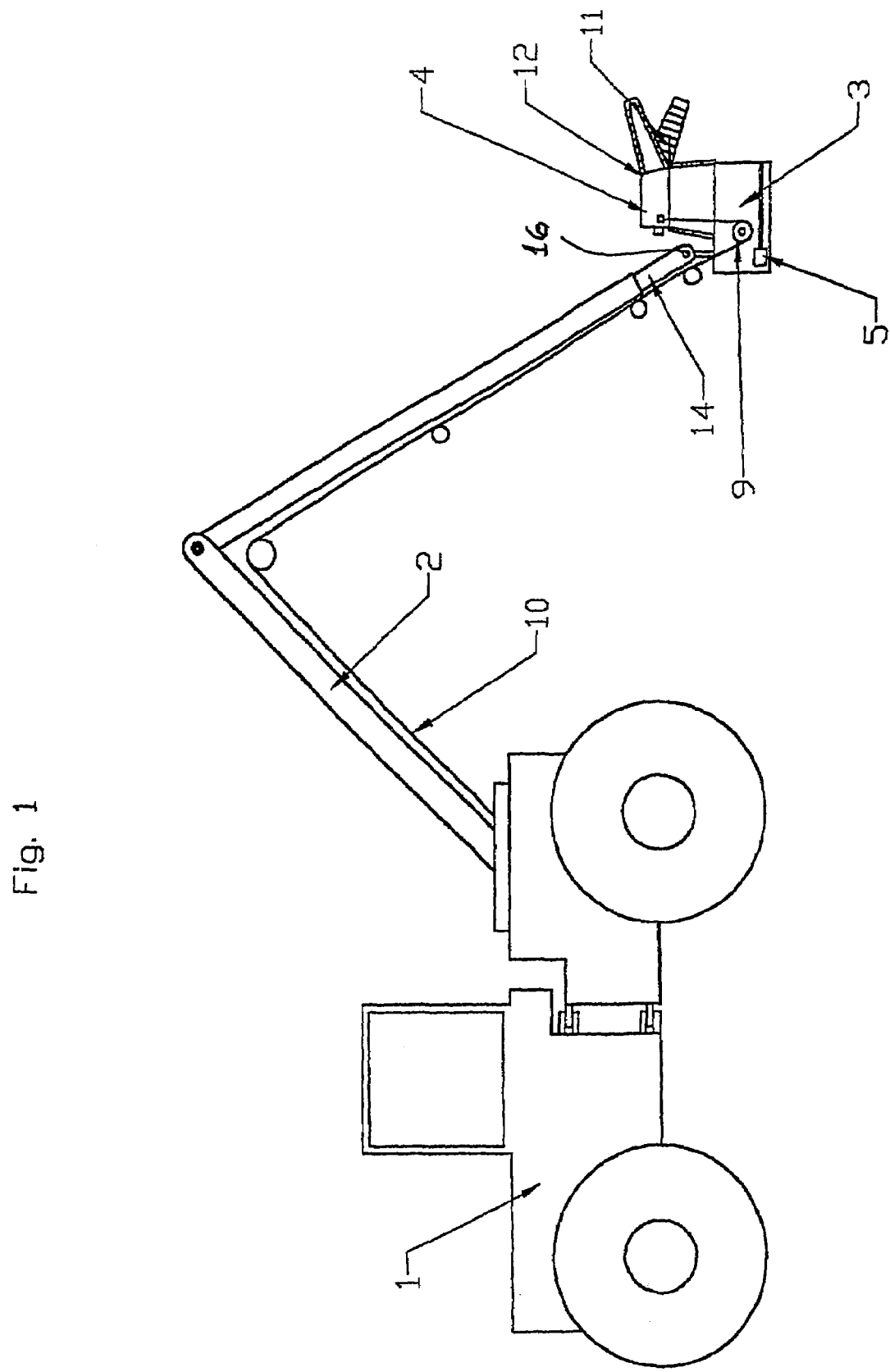
FIG. 1 presents a delimbing apparatus according to the invention, fitted on a forestry machine.
Figure 2:
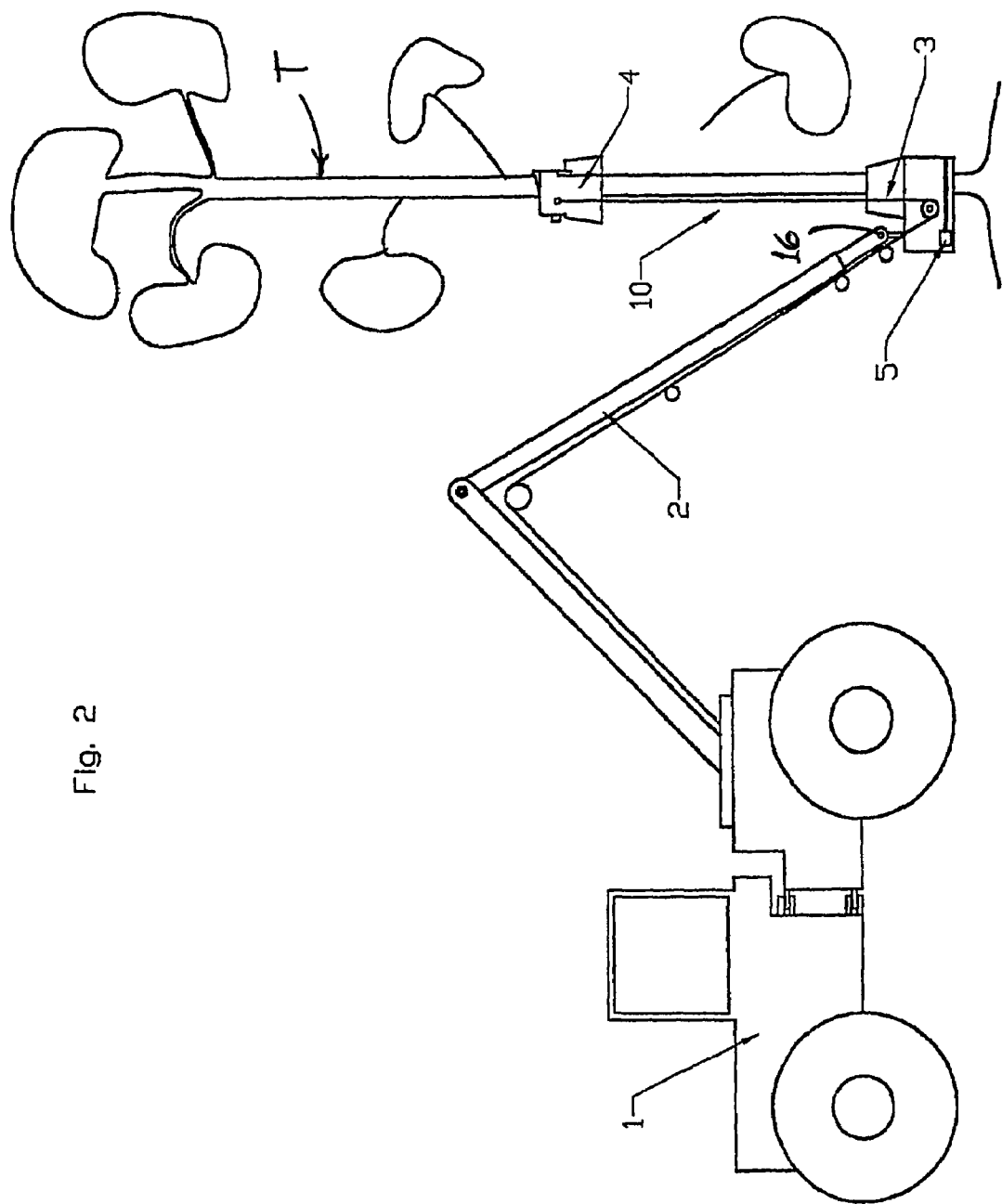
FIG. 2 presents the delimbing apparatus of the invention fitted on forestry machine, delimbing a standing tree.
Figure 3:
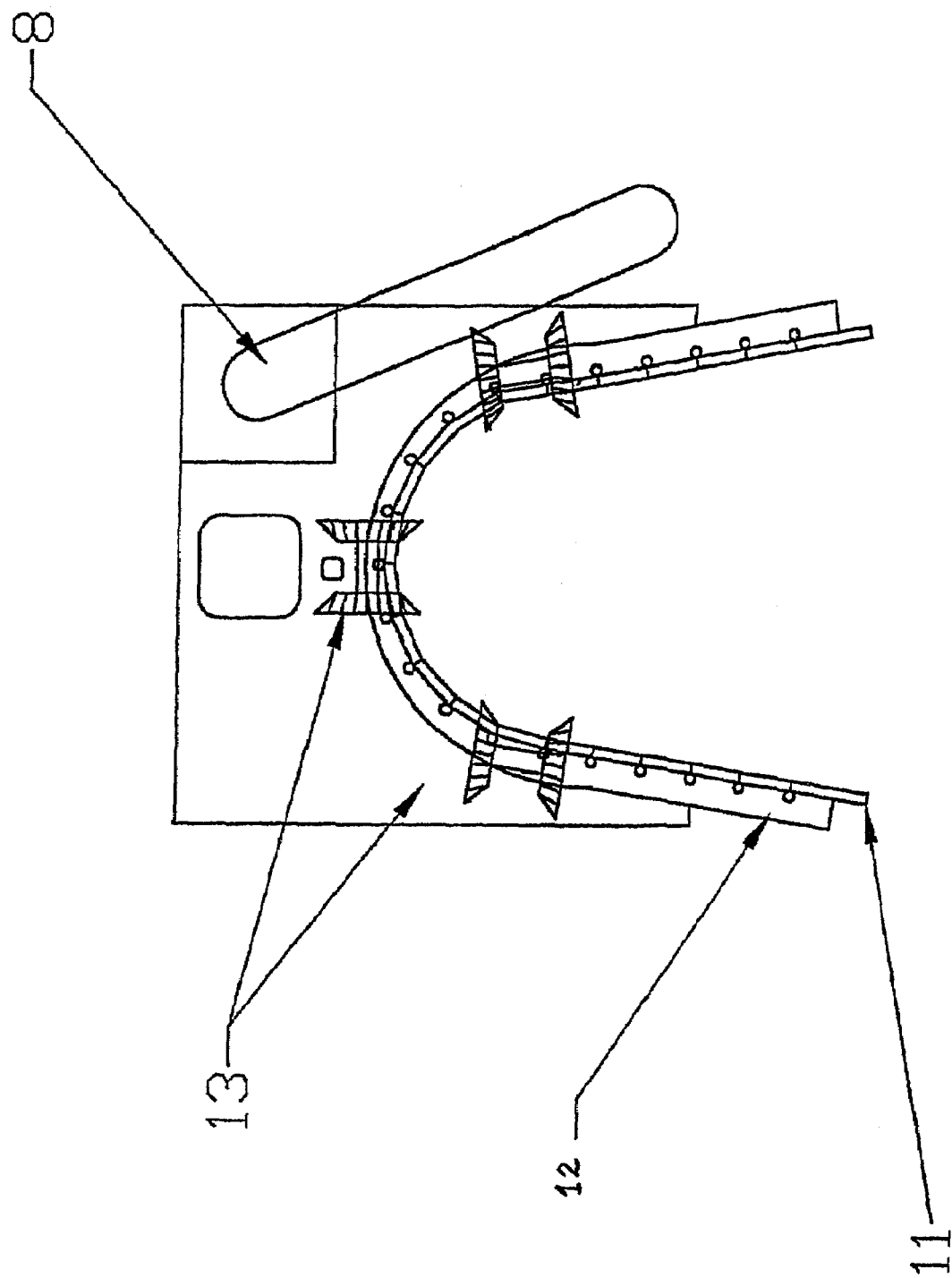
FIG. 3 presents the delimbing head in side view.
Figure 4:
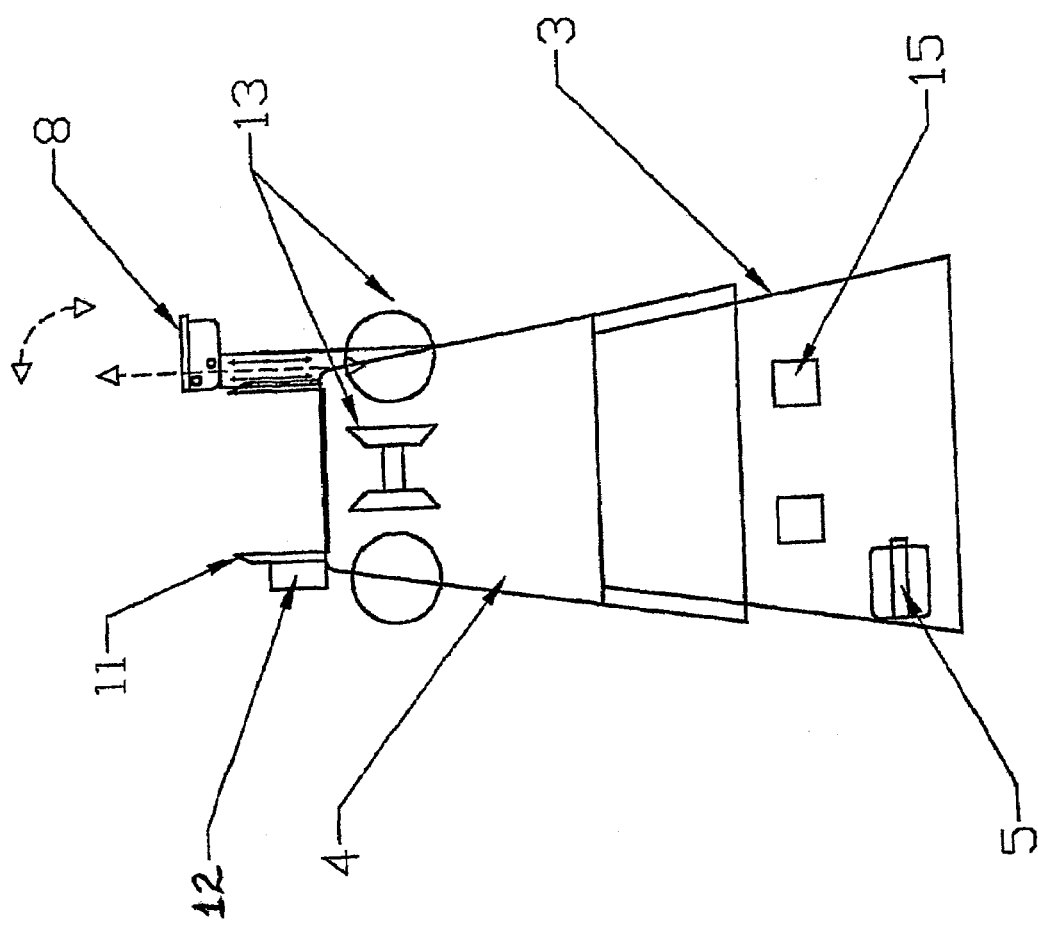
FIG. 4 presents the frame part and the delimbing head with a rotating upper cutter, ready to cut off the top of a tree.

FIGS. 1 and 2 present a delimbing apparatus used for the delimbing of standing trees T and designed to be mounted on a driving carrier 1, which may be a forestry machine moving on wheels or caterpillar chains, e.g. a forest tractor, or even an agricultural tractor, a garden tractor, a snow sledge or a corresponding forest vehicle. The delimbing apparatus is attached to a forestry machine via a boom system 2, which is an A-shaped fully rotatable feeble-constructed mechanism provided with additional extensions 14 reaching to a large distance.

The delimbing apparatus includes a frame part 3 pivotally connected to the boom system. Connected to the frame part 3 is a multi-function flexible hose system 10 for the transmission of operating power. Using a double cable reel 9 provided in the frame part 3, the hose system is also extended to the separate delimbing head 4 which climbs up the trunk of the tree T, so that the cable follows the trunk from the reel and its length is automatically adjusted between the frame part 3 and the delimbing head 4. The frame part 3 is provided with a cutter 5, by means of which trees can also be felled/thinned, and jaws 15 that keep the frame part 3 immovable during the delimbing and possible cutting. The jaws 15 are also applicable for removal of the trunk cut off, e.g. when the trunks are loaded onto a load carrier following the forestry machine. The frame part 3 of the delimbing head is connected to the boom system 2 via a swivel joint 16 that allows the frame part to be turned in a desired direction, which makes it easier to delimb trees standing close by each other side by side and one behind the other without moving the vehicle.

The delimbing head 4 engages the living standing tree T by means of edged laminae 11 that are tightened around the trunk by means of an accordion-type tightening device 12 (gripping device). In addition to the edged laminae, the delimbing head 4 may also be provided with a device for sawing large branches, such as a circular saw, which is used when necessary. The delimbing head 4 moves up and down along the trunk by means of roller or wheel gears 13 having inclinable teeth (FIGS. 3-6), which are rotated by drive motors and which, actuated by the accordion-type tightening device 12, bite into the bark of the tree and, if necessary, into the trunk. The power source of the delimbing head may consist of a hydraulic, pneumatic or electric drive and an electronic control unit or a combination of these, which receives its driving power via the boom system 2 and the frame part 3 from the power engine by means of the continuous multi-function control and operating cable which, following the tree trunk, controls and operates the delimbing head 4. Due to the inclinable motion gear structure, the delimbing head 4 can turn horizontally, and it moves along the trunk, rotating about it if necessary, according to operator control.

The delimbing head 4 has a light construction, consisting of steel, aluminum or plastic components, and it requires no heavy boom system or supporting structure. Using bayonet couplers 17, the delimbing head 4 can be replaced to suit the forest type and the trunk diameter. The delimbing head 4 can be provided with a top cutter 8, which is used for improving trees and for finishing felling areas. It can be turned between vertical and horizontal positions, so it can also be used to cut large branches. The delimbing head 4 may be controlled using voice, light, radio or similar control, which can be programmed as required in each case. A felling cutter 5 cuts the tree at its root in a desired direction, and the trunk, being held by the jaws 15 of the frame part 4, can be moved to a desired place. The top cutter 8 of the delimbing head 4 cuts off the top at a desired height in the case of improving the tree, or the case of felling the tree. The accordion-type tightening device 12 is operated by hydraulic, pneumatic or electric power or by a combination of these. The top cutter 8 removes the unnecessary limbs and improves the felling operation. In addition, the upper part of the frame part 3 has a conical, downward widening shape, so the branches falling down will not be caught on frame part 3, but instead will fall to the sides of the frame part 3. When the delimbing head 4 is coming down, the cone 3C of the frame part 3 guides it back onto its carrier.

The apparatus can be provided with location and measuring devices needed for registering the growing and treated wood stock. In connection with the treatment, the measuring devices perform an evaluation telling the tree, location, size, top height etc., which makes it easier for the forest owner to monitor the situation. Thus, each growing tree is individualized and follow-up becomes easier. A log sheet or the like produced from this registration will later facilitate the determination of wood quality, e.g. in connection with a sale.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. The delimbing apparatus for the delimbing a tree, which can be connected to a moving vehicle via a boom system, said apparatus comprising:
    a frame part and a delimbing head disposed above the frame part,
    wherein the frame part is provided with gripping elements adapted to fasten the frame part to a trunk of the tree at a desired height during delimbing work, and the delimbing head is separable from and movable with respect to the frame part, and is provided with a gripping device adapted to grip the trunk of the tree,
    drive means for moving the delimbing head along the tree trunk and at least one delimbing cutter attached to the delimbing head, and
    a feed and control cable for transmitting operating power and control to the delimbing head,
    the feed and control cable extending between the frame part and the delimbing head via a cable reel on the frame part,
    wherein the frame part is provided with a felling cutter adapted to cut the tree at a root of the tree.

2. The delimbing apparatus according to claim 1, wherein the at least one delimbing cutter is adapted to cut branches and the trunk.

3. The delimbing apparatus according to claim 1, wherein the drive means includes wheels or rollers rotated by a drive motor and controlled by a control unit.

4. The delimbing apparatus according to claim 1, wherein drive means is inclinable, so that the at least one delimbing cutter is movable in a desired direction along the trunk of the tree.

5. The delimbing apparatus according to claim 1, wherein the delimbing cutter is fitted in conjunction with the gripping device,
    wherein the gripping device is a controllable accordion tightening device having controllable elements that are capable of being tightened around the trunk of the tree.

6. The delimbing apparatus according to claim 1, wherein the frame part is adapted to widen conically downward, allowing the delimbing head to be parked in an initial position with respect to the frame part.

7. The delimbing apparatus according to claim 1, wherein the frame part is connected to the boom system via a swivel joint,
    wherein the boom system is adapted to allow the frame part to be turned in a desired direction, in order to enable the apparatus to delimb trees standing adjacent to each other side by side and one behind another, without moving the vehicle.

8. The delimbing apparatus according to claim 1, wherein the boom system connects the frame part to the vehicle and is substantially A-shaped.

9. The delimbing apparatus according to claim 1, wherein the boom system is disposed between the frame part and the vehicle, and is fitted to the vehicle so that the boom system is fully rotatable with respect to the vehicle.

10. The delimbing apparatus according to claim 1, wherein the cable between the delimbing head and the frame part follows the trunk of the tree and moves parallel to the trunk of the tree.

11. The delimbing apparatus according to claim 1, wherein the delimbing head is detachably coupled to the frame part by bayonet couplers, so that the delimbing head is replaceable to suit conditions in different forests and trees with different trunk diameters.

12. The delimbing apparatus according to claim 1, wherein the at least one delimbing cutter is a top cutter fitted to the delimbing head, the top cutter being pivotable between vertical and horizontal positions, so that, in addition to cutting the tree, the top cutter can be used for cutting branches.

13. The delimbing apparatus according to claim 5, wherein the controllable accordion tightening device includes edged laminae that are arranged in a curved shape for bending around the trunk of the tree.

14. The delimbing apparatus according to claim 1, wherein the felling cutter is provided on a lower portion of the frame part adjacent to the cable reel.

15. The delimbing apparatus according to claim 1, wherein the feed and control cable follows the trunk of the tree from the cable reel, and a length of the cable is automatically adjusted between the frame part and the delimbing head, thereby avoiding swinging of the cable.

* * * * *